8-Ethyl-2,3'-Dimethylthiathiazolinocarbocyanine Iodide
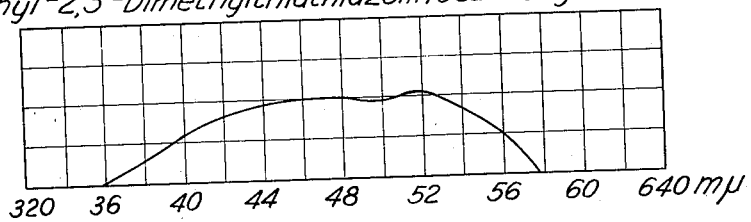
2,3'-Diethyl-8-Methylselenathiazolinocarbocyanine Iodide
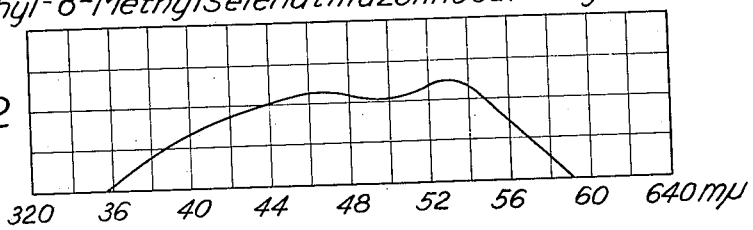
2,3'-Diethyl-8-Methyl-3,4-Benzothiathiazolinocarbocyanine Iodide
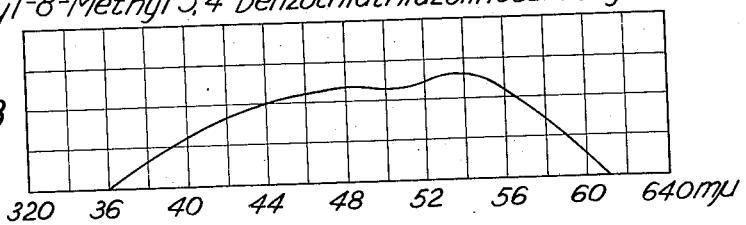
8-Ethyl-2,3'-Dimethyl-3,4-Benzothiathiazolinocarbocyanine Iodide
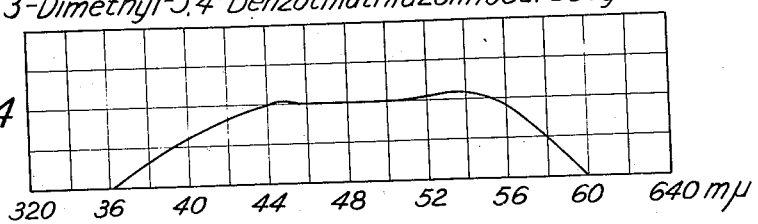
Leslie G. S. Brooker
Frank L. White
INVENTOR Patented Mar. 4, 1941

2,233,510

UNITED STATES PATENT OFFICE 2,233,510

PROCESS OF PREPARING 8-ALKYL UNSYMMETRICAL CARBOCYANINE DYES

Leslie G. S. Brooker and Frank L. White, Rochester, N. Y., assignors to Eastman Kodak Company, Rochester, N. Y., a corporation of New Jersey Application September 14, 1937, Serial No. 163,781

4 Claims. (Cl. 260—240)

This invention relates to dyes and to photographic emulsions sensitized therewith. More particularly, this invention relates to unsymmetrical carbocyanine dyes containing a thiazoline nucleus and an alkyl group substituent at the central carbon atom of the trimethenyl chain and to photographic emulsions sensitized therewith.

This application is a continuation-in-part of our copending application Serial No. 30,736, filed July 10, 1935 (now United States Patent 2,112,140, dated March 22, 1938).

Our new dyes can be represented by the following general formula:

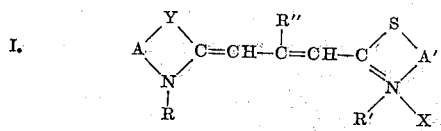

wherein A represents a divalent organic group, such as a phenylene or naphthylene group, A' represents an ethylene group, R, R' and R'' represent alkyl groups, X represents an acid radical and Y represents a divalent atom of the oxygen group of elements, such as sulfur or selenium for example. More particularly, A' represents an ethylene group, such as —CH₂—CH₂—, methylethylene or phenylethylene for example; A represents a phenylene group, such as —C₆H₄—, methylphenylene, phenylphenylene, chlorophenylene, aminophenylene or alkoxyphenylene for example or A represents a naphthylene group, such as α-naphthylene or β-naphthylene or naphthylene groups carrying simple substituents, such as alkyl, chloro, alkoxy, amino or the like for example; R, R' and R'' represent alkyl groups, such as methyl, ethyl, isopropyl, n-butyl, iso-amyl, sec-amyl, n-decyl or allyl for example and X represents an acid radical, such as halide, toluene-sulfonate, alkylsulfate or perchlorate for example. Our new dyes can be called 8-alkylthiathiazolinocarbocyanine dyes, 8-alkylselenathiazolinocarbocyanine dyes, etc.

Our new dyes can be prepared by reacting a ketone compound of the following formula:

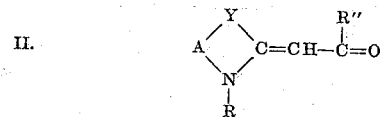

wherein A, R, R'' and Y have the values set forth under Formula I above, with a thiazoline quaternary salt containing a reactive alkyl group, e. g. a reactive methyl group, in the alpha or 2-position. The reactions can be effected by merely heating the ketone compound and quaternary salt together. We have found it advantageous to effect the reactions in the presence of a water-binding agent. We have found that anhydrides of lower fatty acids, such as anhydrides of acetic, propionic or butyric acids for example, are advantageously employed. Diluents can be employed in the reaction mixture. Heat accelerates the formation of our new dyes.

While the process for preparing our new dyes is subject to variation, particularly as respects the nature and quantity of ketone compound employed, the nature and quantity of thiazoline quaternary salt employed, the nature and quantity of water-binding agent employed if any, the nature and quantity of diluent employed if any, the temperatures employed, the time of reaction and the method of isolation and purification of the dyes, the following examples will serve to illustrate the manner of obtaining our new dyes. These examples are not intended to limit our invention.

EXAMPLE 1.—*8-ethyl-2,3'-dimethylthiathiazolinocarbocyanine iodide*

4.38 g. (1 mol.) of 2-methyl-1-propionylmethylene-benzothiazoline and 5.74 g. (1 mol.) of 2-methylthiazoline metho-p-toluenesulfonate were heated in about 15 cc. of propionic anhydride at refluxing temperature for about 15 minutes. The separation of the dye from the reaction mixture was facilitated by the addition of 200 cc. of diethyl ether to the cooled reaction mixture, followed by chilling at 0° C. for several hours. The ether-propionic anhydride layer was decanted. The oily residue was dissolved in hot methyl alcohol (5 cc.) and the dye was converted to the iodide by the addition of a hot aqueous solution of potassium iodide. Upon cooling, the dye-iodide separated. It was filtered, washed with water and boiled with acetone. After two recrystallizations from 95% ethyl alcohol, the dye was obtained as brownish-orange crystals, melting at 258° to 260° C. with decomposition. The dye has the following formula:

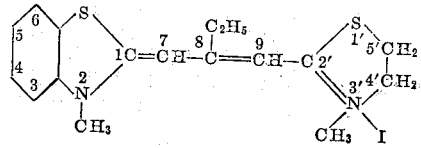

EXAMPLE 2. — *2,3'-diethyl-8-methylselenathiazolinocarbocyanine iodide*

5.32 g. (1 mol.) of 1-acetylmethyl-2-ethylbenzoselenazoline and 6.02 g. (1 mol.) of 2-methylthiazoline etho-p-toluene-sulfonate were heated in about 10 cc. of propionic anhydride at refluxing temperature for about 6 minutes. The dye was isolated from the reaction mixture and converted to the iodide as in Example 1. After two recrystallizations from methyl alcohol, the dye was obtained as dull reddish crystals, melting at 251° to 252° C. with decomposition. The dye has the following formula:

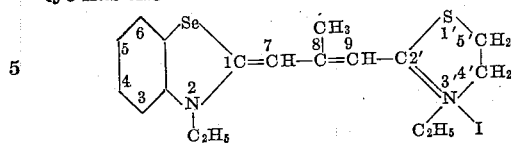

EXAMPLE 3.—*2,3'-diethyl-8-methyl-3,4 - benzothiathiazolinocarbocyanine iodide*

5.38 g. (1 mol.) of 2-acetylmethylene-1-ethyl-β-naphthothiazoline and 6.02 g. (1 mol.) of 2-methylthiazoline etho-p-toluenesulfonate were heated in about 15 cc. of propionic anhydride at refluxing temperature for about 15 minutes. The dye was isolated and converted to the iodide as in Example 1. After two recrystallizations from 95% ethyl alcohol, the dye was obtained as dull brownish-red crystals melting at 226° to 228° C. with decomposition. The dye has the following formula:

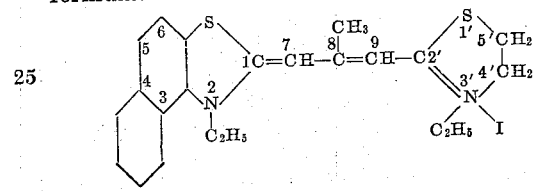

EXAMPLE 4.—*8-ethyl-2,3'-dimethyl-3,4 - benzothiathiazolinocarbocyanine iodide*

5.38 g. (1 mol.) of 1-methyl-2-propionylmethylene-β-naphthothiazoline and 5.74 g. (1 mol.) of 2-methylthiazoline metho-p-toluenesulfonate were heated in about 15 cc. of propionic anhydride for about 20 minutes at refluxing temperature. The dye was isolated and converted to the iodide as in Example 1. After two recrystallizations, the dye was obtained as dark brownish crystals melting at 231° to 232° C. with decomposition. The dye has the following formula:

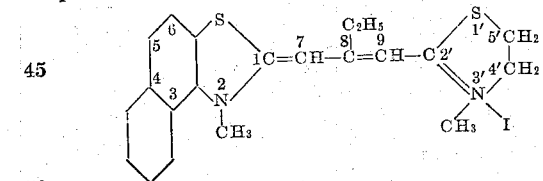

EXAMPLE 5.—*2,3'-diethyl-8-methylthiathiazolinocarbocyanine iodide*

2.19 g. (1 mol.) of 1-acetylmethylene-2-ethyl-benzothiazoline and 3.01 g. (1 mol.) of 2-methylthiazoline etho-p-toluenesulfonate were heated in about 10 cc. of acetic anhydride for about 10 minutes at refluxing temperature. The dye was isolated and converted to the iodide as in Example 1. After two recrystallizations from methyl alcohol, the dye was obtained as minute reddish crystals melting at 228° to 230° C. with decomposition. The dye has the following formula:

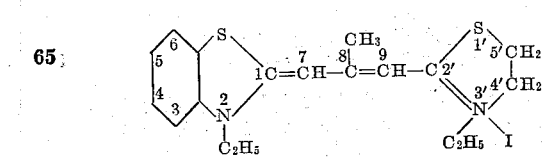

In preparing our new dyes, we have found it advantageous to employ the thiazoline toluenesulfonates. Since the dye-toluenesulfonates were fairly soluble, it is advantageous to isolate the dyes as the iodides with potassium iodide. The dyes can similarly be conveniently isolated as the bromides or perchlorates with potassium bromide or sodium perchlorate.

The ketone compounds employed in our process can be prepared by reacting an appropriate cyclicammonium quaternary salt containing a reactive alkyl group with an acyl halide in the presence of an acid-binding agent. Pyridine is advantageously employed as the acid-binding agent. For example, to prepare 1-acetylmethylene-2-ethylbenzothiazoline, one molecular proportion of 1-methylbenzothiazole ethiodide can be reacted with acetyl chloride in the presence of pyridine. The process for preparing the ketone compounds is fully described in British Patent 466,269. 1-acetylmethylene-2 - ethylbenzothiazoline can also be called 1-acetonylidene-2-ethylbenzothiazoline.

The thiazoline toluenesulfonates employed in the above examples can be prepared as set forth in the following examples:

EXAMPLE 6.—*2-methylthiazoline metho-p-toluenesulfonate*

2.02 g. (1 mol.) of 2-methylthiazoline and 3.72 g. (1 mol.) of methyl-p-toluenesulfonate were heated at 100° C. for about 90 hours. The resulting crude product was employed without further purification.

EXAMPLE 7.—*2-methylthiazoline etho-p-toluenesulfonate*

2.02 g. (1 mol.) of 2-methylthiazoline and 4.00 g. (1 mol.) of ethyl-p-toluenesulfonate were heated together at 105° to 110° C. for about 100 hours. The resulting crude product was used without further purification.

We have found it advantageous to employ one molecular proportion of the thiazoline quaternary salt to react with one molecular proportion of the ketone compound. However, an excess of either can be employed.

Our new unsymmetrical dyes give rise to photographic emulsions possessing novel green speeds when incorporated in the emulsions. By means of our new dyes, emulsions sensitized in a novel manner to light of wavelengths between about 515 mu to about 550 mu can be prepared. Our invention is particularly directed to the customarily employed gelatino-silver-halide emulsions. However, our new unsymmetrical dyes can be employed in emulsions in which the carrier is other than gelatin, for example, a resinous substance or cellulosic derivative which has substantially no deleterious effect on the light-sensitive materials. As silver halide emulsions, we include such emulsions as are commonly employed in the art, for example, silver chloride or silver bromide emulsions which can contain other salts which may be light-sensitive. By way of illustration, the herein-described sensitized photographic emulsions were prepared employing ordinary gelatino-silver-bromide emulsions.

In the preparation of photographic emulsions containing our new unsymmetrical dyes, it is only necessary to disperse the dyes in the emulsions. The methods of incorporating dyes in emulsions are simple and well known to those skilled in the art. In practicing our invention it is convenient to add the dyes from their solutions in appropriate solvents. The solvent must, of course, be compatible with the emulsion, substantially free from any deleterious effect on the light-sensitive materials and capable of dissolving the dyes. Methanol has proven satisfactory as a solvent for our new dyes. The dyes are advantageously incorporated in the finished, washed emulsion and should be uniformly distributed throughout to secure the best results.

The concentration of our new unsymmetrical dyes in the emulsions can vary widely, e. g. from about 5 to about 100 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a flowable gelatino-silver-halide emulsion with stirring. Stirring is continued until the dye is uniformly and practically homogeneously dispersed. Ordinarily 10 to 20 mg. of dye per 1000 cc. of flowable emulsion will suffice to produce the maximum sensitizing effect with the ordinary gelatino-silver-halide emulsions. The above statements are only illustrative and not to be understood as limiting our invention in any sense, as it will be apparent that our dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion, whereby the dye exerts a sensitizing effect upon the emulsions, as well as a photographic element comprising a support, ordinarily transparent, upon which the light-sensitive emulsion is coated or spread and allowed to dry.

The accompanying drawing is by way of illustration and depicts the sensitivity of emulsions containing four of our new dyes. Each figure in the drawing is a diagrammatic reproduction of a spectrogram showing the sensitivity of a silver bromide emulsion containing one of our new dyes.

In Fig. 1, the sensitivity of an ordinary gelatino-silver-bromide emulsion containing 8-ethyl-2,3'-dimethylthiathiazolinocarbocyanine iodide is depicted. Maximum sensitivity is in the green at about 515 mu and the extra sensitivity conferred by the dye extends to nearly 600 mu.

In Fig. 2, the sensitivity of an ordinary gelatino-silver-bromide emulsion containing 2,3'-diethyl - 8 - methylselenathiazolinocarbocyanine iodide is depicted. Maximum sensitivity is in the green at about 530 mu and the extra sensitivity conferred by the dye extends to beyond 600 mu.

In Fig. 3, the sensitivity of an ordinary gelatino-silver bromide emulsion containing 2,3'-diethyl - 8 - methyl-3,4-benzothiathiazolinocarbocyanine iodide is depicted. Maximum sensitivity is in the green at about 540 mu and the extra sensitivity conferred by the dye extends to beyond 600 mu.

In Fig. 4, the sensitivity of an ordinary gelatino-silver-bromide emulsion containing 8-ethyl - 2,3' - dimethyl-3,4-benzothiathiazolinocarbocyanine iodide is depicted. Maximum sensitivity is in the green at about 535 mu and the extra sensitivity conferred by the dye extends to about 600 mu.

Still further examples illustrating our invention could be cited, but the foregoing will be sufficient to teach those skilled in the art the manner in which our invention is carried out.

What we claim as our invention and desire to be secured by Letters Patent of the United States is:

1. A process for preparing a dye comprising reacting, in the presence of a water-binding agent, a 2-methylthiazoline quaternary salt with a ketone compound of the following formula:

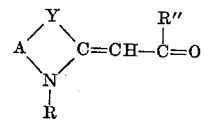

wherein A represents an organic group selected from the group consisting of phenylene and naphthylene groups, Y represents a divalent atom selected from the group consisting of sulfur and selenium and R and R'' represent alkyl groups.

2. A process for preparing a dye comprising reacting, in the presence of a water-binding agent, a 2-methylthiazoline quaternary salt with a ketone compound of the following formula:

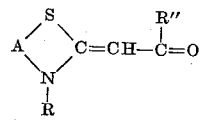

wherein A represents an organic group selected from the group consisting of phenylene and naphthylene groups and R and R'' represent alkyl groups.

3. A process for preparing a dye comprising reacting, in the presence of propionic anhydride water-binding agent, a 2-methylthiazoline alkyl-p-toluenesulfonate with a ketone compound of the following formula:

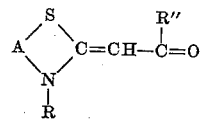

wherein A represents an organic group selected from the group consisting of phenylene and naphthylene groups and R and R'' represent alkyl groups.

4. A process for preparing a dye comprising reacting, in the presence of a water-binding agent, a 2-methylthiazoline alkyl-p-toluenesulfonate with a ketone compound of the following formula:

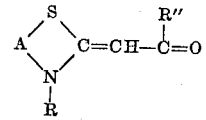

wherein A represents an organic group selected from the group consisting of phenylene and naphthylene groups and R and R'' represent alkyl groups.

LESLIE G. S. BROOKER.
FRANK L. WHITE.